United States Patent
Takahashi (10) Patent No.: US 6,563,987 B1
(45) Date of Patent: May 13, 2003

(54) OPTICAL MULTIPLEXING/ DEMULTIPLEXING DEVICE WITH VARIABLE BRANCHING RATIO AND OPTICAL COUPLER WITH VARIABLE COUPLING RATIO

(75) Inventor: Mitsuo Takahashi, Matsudo (JP)

(73) Assignee: Seikoh Giken Co., Ltd., Matsudo (JP)

( * ) Notice: Subject to any disclaimer, the term of this patent is extended or adjusted under 35 U.S.C. 154(b) by 89 days.

(21) Appl. No.: 09/669,636

(22) Filed: Sep. 26, 2000

(30) Foreign Application Priority Data

Sep. 30, 1999 (JP) .......................................... 11-278427

(51) Int. Cl.⁷ .............................. G02B 6/26; G02B 6/42
(52) U.S. Cl. .............................. 385/39; 385/16; 385/18; 385/19; 385/24; 385/34; 385/25; 359/131
(58) Field of Search .............................. 385/34, 18, 47, 385/25, 39, 19, 24, 16; 359/131

(56) References Cited

U.S. PATENT DOCUMENTS

| | | | | |
|---|---|---|---|---|
| 5,838,847 A | * | 11/1998 | Pan | 385/18 |
| 6,320,996 B1 | * | 11/2001 | Scobey | 385/18 |
| 6,415,067 B1 | * | 7/2002 | Copner | 385/16 |

FOREIGN PATENT DOCUMENTS

JP          58-969435        * 11/1984

* cited by examiner

Primary Examiner—Cassandra Spyrou
Assistant Examiner—Leo Boutsikaris
(74) Attorney, Agent, or Firm—Venable; Norman N. Kunitz; Chad C. Anderson (57) ABSTRACT

An optical multiplexing/demultiplexing device with variable branching ratio is disclosed. The device includes a first collimator lens assembly having a first collimator lens 14, and first and second optical fibers $F_1$ and $F_2$ which have distal ends thereof optically coupled to the lens, and are away from each other by a distance "d," an optical axis of the lens being positioned at a midpoint therebetween, a second collimator lens assembly having a second collimator lens 15 and a third optical fiber $F_3$ which has a distal end thereof optically coupled to the lens, being away from an optical axis of the lens by a distance "d/2" and reflection mirror means. The reflection mirror means reflects and couples a part or all of a parallel beam of an expanded mode field area, which is emitted from the first optical fiber and formed on a reference plane, to the second optical fiber, or transmits and connects all or a part of the parallel beam to the third optical fiber.

6 Claims, 9 Drawing Sheets

PRIOR ART

FIG.11

PRIOR ART

OPTICAL MULTIPLEXING/ DEMULTIPLEXING DEVICE WITH VARIABLE BRANCHING RATIO AND OPTICAL COUPLER WITH VARIABLE COUPLING RATIO

BACKGROUND OF THE INVENTION

1. Field of the Invention

The present invention generally relates to an optical multiplexing/demultiplexing device with a variable branching ratio or an optical coupler with a variable coupling ratio that is used with an optical fiber communication system. More particularly, the present invention relates to an optical multiplexing/demultiplexing device with a variable branching ratio that is capable of continuously changing a distribution ratio $F_{2f}:F_{3f}$ of light intensities of two optical fiber circuits $F_2$ and $F_3$ from 0:100 to 100:0 so as to provide branched outputs when distributing light from a single optical fiber $F_1$ to other two optical fiber circuits $F_2$ and $F_3$, or a similar optical coupler with variable coupling ratio.

2. Description of the Related Art

Figure 9:
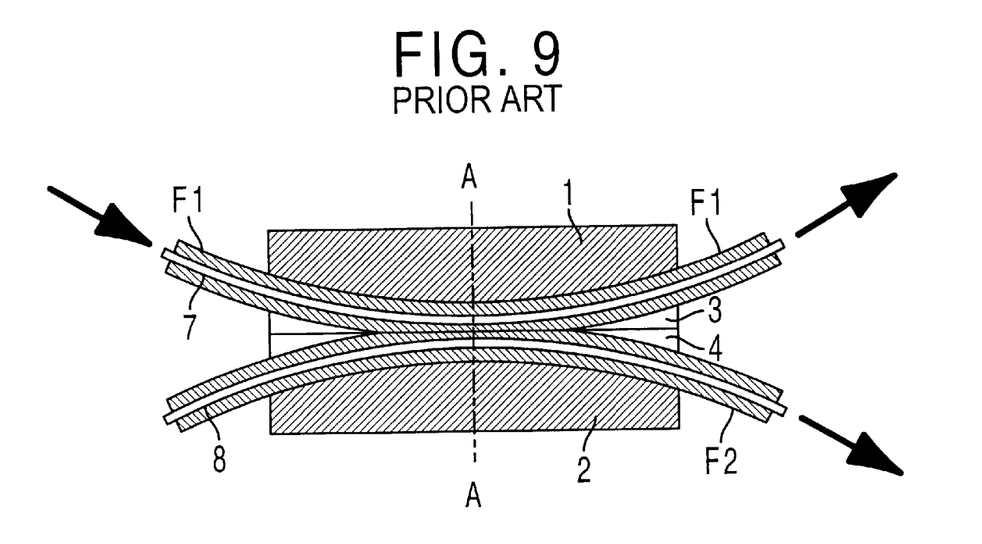
FIG. 9 is a side sectional view of a conventional optical multiplexing/demultiplexing device with a variable branching ratio.
Figure 10:
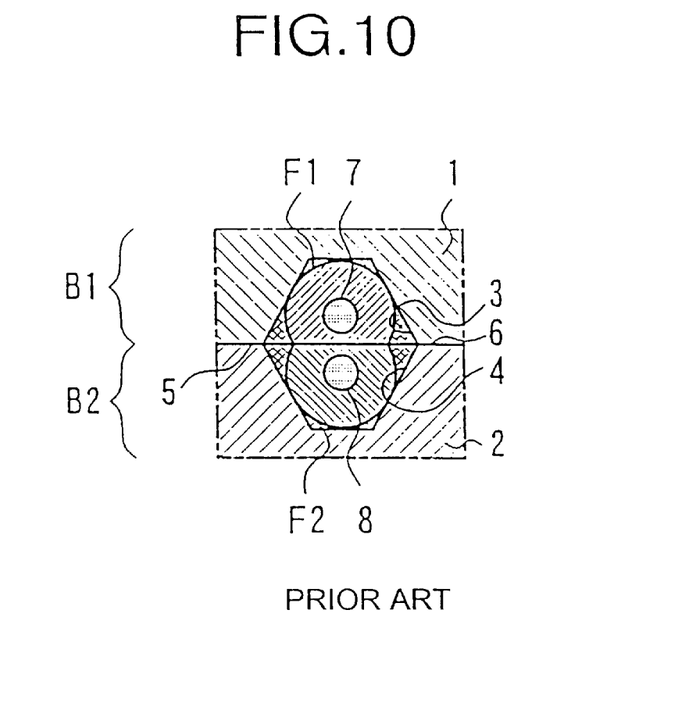
FIG. 10 is a sectional view along the line AA when the optical multiplexing/demultiplexing device with a variable branching ratio is set to provide the same branching ratio.
Figure 11:
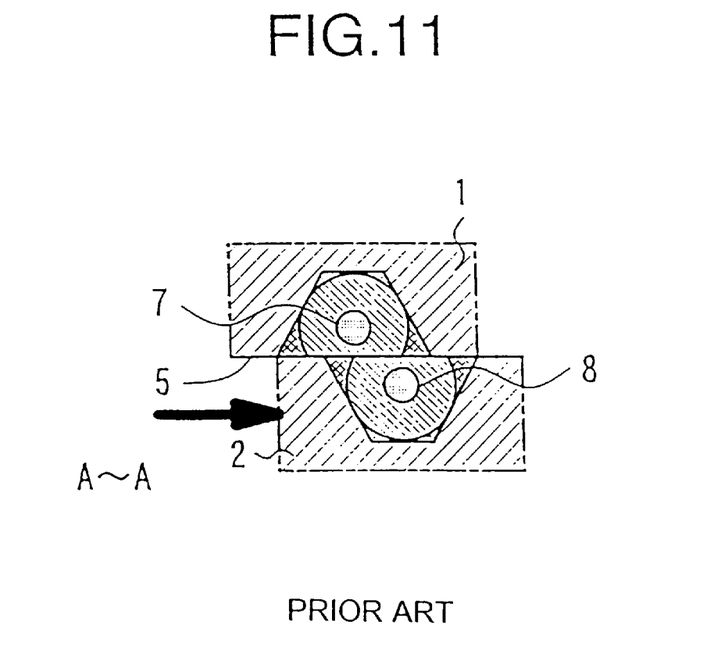
FIG. 11 is a sectional view along the line AA at a central portion when the branching ratio of the optical multiplexing/demultiplexing device with a variable branching ratio has been changed.

A conventional optical multiplexing/demultiplexing device with a variable branching ratio will be described. A multiplexing/demultiplexing device with a variable branching ratio shown in FIG. 9 through FIG. 11 is the optical multiplexing/demultiplexing device with a variable branching ratio in accordance with a prior invention (U.S. Pat. No. 5,050,950) by the inventors of the present application. FIG. 9 is a side sectional view of the multiplexing/demultiplexing device with a variable branching ratio, FIG. 10 is a sectional view taken at the line AA in a central portion at the same branching ratio, and FIG. 11 is a sectional view taken at the line AA in a central portion at a different branching ratio. The multiplexing/demultiplexing device with a variable branching ratio with an abraded block is constructed by a block B1 with an optical fiber $F_1$ and a block B2 with an optical fiber $F_2$ that are opposed to each other and brought in contact. A clad of the optical fiber $F_1$ has an optical fiber core 7 at its center, and a clad of the optical fiber $F_2$ has an optical fiber core 8 at its center. Block members 1 and 2 are provided with V-grooves 3 and 4, respectively, and the optical fibers $F_1$ and $F_2$ are fitted in the V-grooves with their bellies curved as illustrated and adhesively secured. The block B1 with the optical fiber is abraded as follows. First, one end of the optical fiber $F_1$ of the block member 1 is coupled to a light source, while the other end is coupled to a power meter to measure loss. Under this measurement condition, a surface 5 of the block member 1 is scrubbed together with the optical fiber $F_1$ until the loss reaches 3 dB (=50%). A central portion of the clad of the optical fiber $F_1$ is plane-abraded to a point in the vicinity of the core 7. The block B2 with the optical fiber is also abraded in the same manner.

Next, the blocks B1 and B2 with the optical fibers are brought in close contact as shown in FIG. 10 so that they are vertically symmetrical. The optical fibers $F_1$ and $F_2$ are coupled by the evanescent effect, and an optical multiplexing/demultiplexing device having a branching ratio of 50:50 is formed. Fifty per cent of input light from one end of the optical fiber $F_1$ is output to the other end of the optical fiber $F_1$, while the other 50% of the input light is output to the optical fiber $F_2$.

When the block B2 with the optical fiber is moved in a direction of an arrow as shown in FIG. 11, optical coupling due to the evanescent effect between the optical fiber $F_1$ and $F_2$ weakens in proportion to the moving distance. A quantity of light, 50%, transmitted from the optical fiber $F_1$ to the branched side of the optical fiber $F_1$ remains unchanged, while a quantity of light transmitted to the optical fiber $F_2$ decreases, 50% being an upper limited. Most conventional abraded-block type optical multiplexing/demultiplexing devices with variable branching ratios are based on the variable branching ratio principle described above.

The conventional abraded-block type optical multiplexing/demultiplexing device with a variable branching ratio set forth above poses the following problems, many of which have been verified by prototype experiments performed by the assignee:

(1) In the optical fiber multiplexing/demultiplexing device with a variable branching ratio, an optical fiber formed of fine, fragile quartz glass is curved and adhesively secured into a V-groove of a block member to polish a surface of the optical fiber. Hence, the optical fiber is frequently damaged during the process, making it difficult to achieve stable manufacture.

(2) As the optical branching ratio increases, positioning adjustment between the blocks B1 and B2 with optical fibers requires higher accuracy in units of 0.1 μm, making it extremely difficult to perform adjustment. In addition to the need for highly accurate positioning, variations in the optical branching ratio characteristics caused by an ambient temperature and external forces increase, posing disadvantages from a viewpoint of reliability.

(3) From an aspect of operating principle, when the optical branching ratio is 50:50, there should not be a great optical insertion loss. For example, when an optical branching ratio of the branched end of the optical fiber $F_1$ to $F_2$ is set to 100:10, the maximum branched output 50% to the branched end of the optical fiber $F_1$ corresponds to the optical branching ratio 100; therefore, the optical branching ratio 10 to the optical fiber $F_2$ will be about 5%, resulting in a 45% optical insertion loss with respect to the original quantity of light of the optical fiber $F_1$ at the input end.

SUMMARY OF THE INVENTION

Accordingly, it is an object of the present invention to provide an optical multiplexing/demultiplexing device with a variable branching ratio based on a new principle that has overcome the difficulties in the conventional optical multiplexing/demultiplexing device with a variable branching ratio (abraded-block type) described above.

To this end, according to one aspect of the present invention, there is provided an optical multiplexing/demultiplexing device with a variable branching ratio that employs a new reflection mirror system to permit a simple structure and easy mass production of its component parts.

According to another aspect of the present invention, there is provided a reflection mirror type optical multiplexing/demultiplexing device with a variable branching ratio that permits easy adjustment for setting to a high branching ratio and exhibits high reliability against environmental conditions.

According to yet another object of the present invention, there is provided a reflection mirror type optical multiplexing/demultiplexing device with a variable branching ratio that exhibits a small optical insertion loss even at a high branching ratio.

To this end, according to one aspect of the present invention, there is provided an optical multiplexing/ demultiplexing device with variable branching ratio comprising a first collimator lens assembly including a first collimator lens, and first and second optical fibers $F_1$ and $F_2$ which have distal ends thereof optically coupled to one end face of the lens being away from each other by a distance "d," an optical axis, of the lens positioned at a midpoint therebetween, a second collimator lens assembly including a second collimator lens and a third optical fiber $F_3$ which has a distal end thereof optically coupled to one end face of the lens, being away from an optical axis of the lens by a distance "d/2," aligning means for disposing the first and second collimator lens assemblies so that they oppose each other symmetrically with respect to an optical reference plane, with optical axis thereof being aligned, and for fixedly supporting the collimator lens assemblies so that an image at the distal end of the first optical fiber is formed at the distal end of the third optical fiber, reflection mirror means which is supported by the aligning means so that the reflection mirror means may move within the reference plane, and reflects and connects a part or all of a parallel beam of an expanded mode field area that is emitted from the first optical fiber and formed on the reference plane to the second optical fiber $F_2$, or transmits and connects all or a part of the parallel beam to the third optical fiber $F_3$, and driving means for moving the reflection mirror.

The first and second collimator lenses are rod lenses having a reference length of 0.25 pitch, and the first and second optical fibers are supported by a first ferrule, while the third optical fiber is supported b a second ferrule, these three optical fibers being coupled to the rod lenses constituting the first and second collimator lens assemblies. A shaft of the reflection mirror of the reflection mirror means is inserted in a shaft hole which is provided in the aligning means and parallel to the optical axis of the collimator lenses, and the reflection mirror means is guided by one or more guiding surfaces positioned virtually at right angles to the shaft hole of the aligning means. The shaft of the reflection mirror of the reflection mirror means has a behavior of rotating in one direction with respect to the aligning means, and the driving means for moving the reflection mirror moves the mirror means against the behavior of rotating in one direction.

The reflection mirror uses a metal, such as stainless steel, as a material thereof, and both surfaces of the metal are provided with Ti—N coating of a hardness of MHv 1800 or more and coated with a film having high reflectivity, such as gold (Au) or platinum Pt), by sputtering or chemical plating.

Adopting the same construction as that of the, above demultiplexing device makes it possible to implement an optical coupler with a variable coupling ratio.

To this end, according to one aspect of the present invention, there is provided an optical coupler with variable coupling ratio comprising a first collimator lens assembly including a first collimator lens and a first optical fiber which has a distal end thereof optically coupled to one end face of the lens, being away from an optical axis of the lens by a predetermined distance, a second collimator lens assembly including a second collimator lens and a second optical fiber which has a distal end thereof optically coupled to one end face of the lens, being away from an optical axis of the lens by a predetermined distance, aligning means for disposing the first and second collimator lens assemblies so that they oppose each other symmetrically with respect to an optical reference plane, with optical axis thereof being aligned, and for fixedly supporting the collimator lens assemblies so that an image at the distal end of the first optical fiber is formed at the distal end of the second optical fiber, shutter means which is supported by the aligning means so that the shutter means may move within the reference plane, and reflects and connects a part or all of a parallel beam of an expanded mode field area that is emitted from the first optical fiber and formed on the reference plane to the second optical fiber, and driving means for moving the shutter.

According to another aspect of the present invention, there is provided an optical coupler with variable coupling ratio comprising a collimator lens assembly including a collimator lens and first and second optical fibers $F_1$ and $F_2$ which have distal ends thereof optically coupled to one end face of the lens, being away from each other by a predetermined distance with an optical axis of the lens positioned at a midpoint therebetween, aligning means for fixedly supporting the collimator lens assembly so that an optical axis of the collimator lens assembly is positioned at right angles to an optical reference plane, reflection mirror means including a reflection mirror which is supported by the aligning means so that the reflection mirror may move within the reference plane, and reflects and connects a part or all of a parallel beam of an expanded mode field area that is emitted from the first optical fiber and formed on the reference plane to the second optical fiber $F_2$, and driving means for moving the reflection mirror.

DESCRIPTION OF THE PREFERRED EMBODIMENTS

Embodiments of a reflection mirror type optical multiplexing/demultiplexing device with a variable branching ratio in accordance with the present invention will be described in detail mainly with reference to accompanying drawings. FIG. 4 and FIG. 5 are schematic diagrams illustrating an operation principle of the optical multiplexing/demultiplexing device with a variable branching ratio in accordance with the present invention.

A first collimator lens assembly includes a rod lens 9 having a reference length of 0.25 pitch, and first and second optical fibers $F_1$ and $F_2$ which have distal ends thereof optically coupled to one end face of the lens, being away from each other by a distance "d," an optical axis of the rod lens 9 positioned at a midpoint therebetween. Similarly, a second collimator lens assembly includes a rod lens 10 having a reference length of 0.25 pitch, and a third optical fiber $F_3$ which has a distal end thereof optically coupled to one end face of the lens, being away from an optical axis of the rod lens by a distance "d/2." An aligning means, which is not shown in FIGS. 4 and 5, makes other end faces of the rod lenses 9 and 10 of the first and second collimator lens assemblies oppose each other with a gap provided therebetween, optical axis thereof being aligned. The aligning means fixedly supports the collimator lens assemblies so that an image at the distal end of the first optical fiber is formed at the distal end of the third optical fiber. A surface which is positioned at a midpoint between the rod lens 9 and the rod lens 10, and at right angles with respect to the optical axis will be referred to as an optical reference plane or simply as a reference plane.

A reflection mirror means is supported by the aligning means in the gap so that the reflection mirror may move within the reference plane in a direction at right angles to the optical axis of the rod lenses. The reflection mirror means includes a reflection mirror 12 that reflects a part or all of a parallel beam of an expanded mode field area that is emitted from the first optical fiber into the gap through the rod lens, and couples the parallel beam to the second optical fiber $F_2$, then allows all or a part of the parallel beam to be transmitted and coupled to the third optical fiber $F_3$.

Figure 4A:
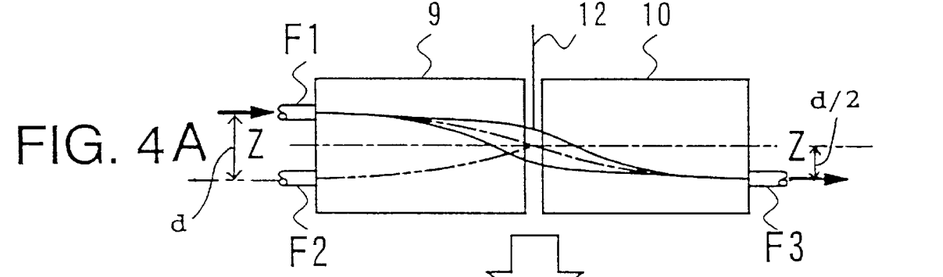
FIG. 4 is a schematic diagram illustrating an operation principle of the optical multiplexing/demultiplexing device with a variable branching ratio in accordance with the present invention.
Figure 5A:
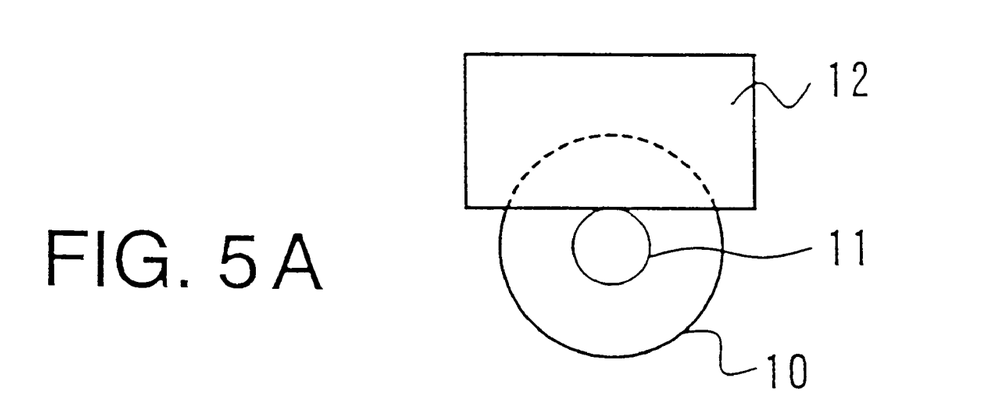
FIG. 5 is another schematic diagram illustrating an operation principle of the optical multiplexing/demultiplexing device with the variable branching ratio in accordance with the present invention, wherein a relationship between a mode field and a reflection mirror is shown.

FIG. 4A and FIG. 5A illustrate a state wherein the reflection mirror 12 is positioned out of a mode field diameter 11, and 100% of light from the first optical fiber $F_1$ is coupled to the third optical fiber $F_3$. In this application, the mode field diameter means a diameter of a luminous flux of light measured at a point where, for example, the light from the first optical fiber $F_1$ has been converged through the rod lens 9 and substantially collimated. The light from the first optical fiber $F_1$ turns into a parallel luminous flux in a space that includes the reference plane. A central axis of the parallel luminous flux is inclined at a predetermined angle in relation to an optical axis Z. The same applies to light emitted from the second and third optical fibers $F_2$ and $F_3$ and incident on the rod lenses, and the mode field diameter 11 is formed on the reference plane.

Figure 4B:
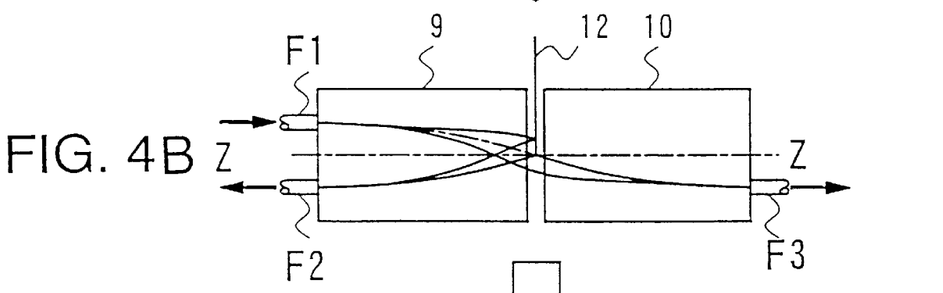
Figure 5B:
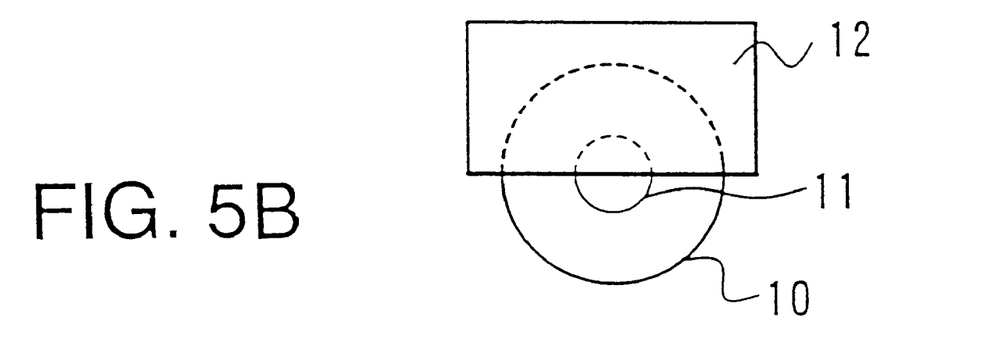

FIG. 4B and FIG. 5B illustrate a state wherein the reflection mirror 12 covers a mode field between the rod lenses 9 and 10 by 50%. In this case, the light from the optical fiber $F_1$ is transmitted by 50% to the optical fiber $F_2$ at a reflection end, and also output by 50% to the optical fiber $F_3$ on a transmission end. Hence, the optical branching ratio in this case will be an equal branching ratio 50:50.

Figure 4C:
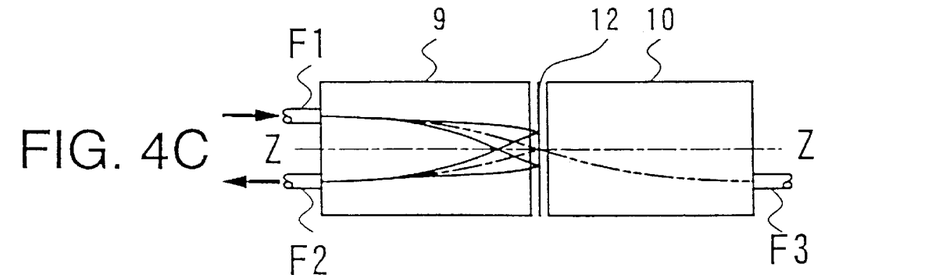
Figure 5C:
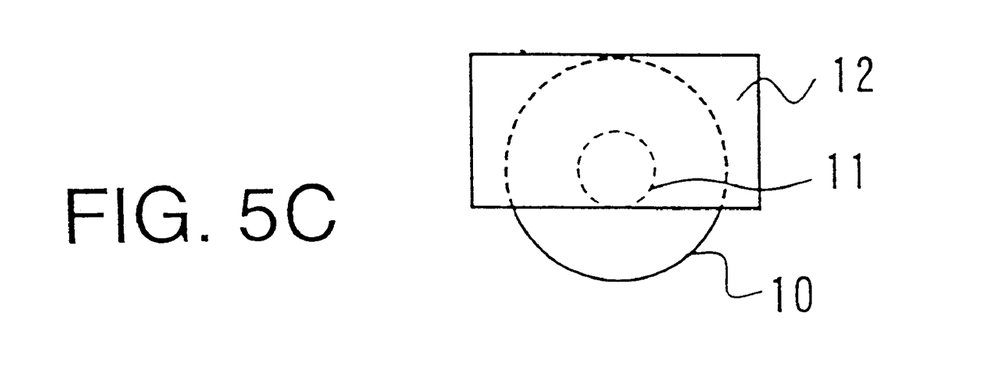

FIG. 4C and FIG. 5C illustrate a state wherein the reflection mirror 12 covers the mode field between the rod lenses 9 and 10 by 100%. In this case, the light from the optical fiber $F_1$ is all reflected; hence, the light is output by 100% to the optical fiber $F_2$ on the reflection side, while no light is output to the optical fiber $F_3$ on the transmission end. Thus, the optical branching ratio in this case will be 100:0.

Figure 1:
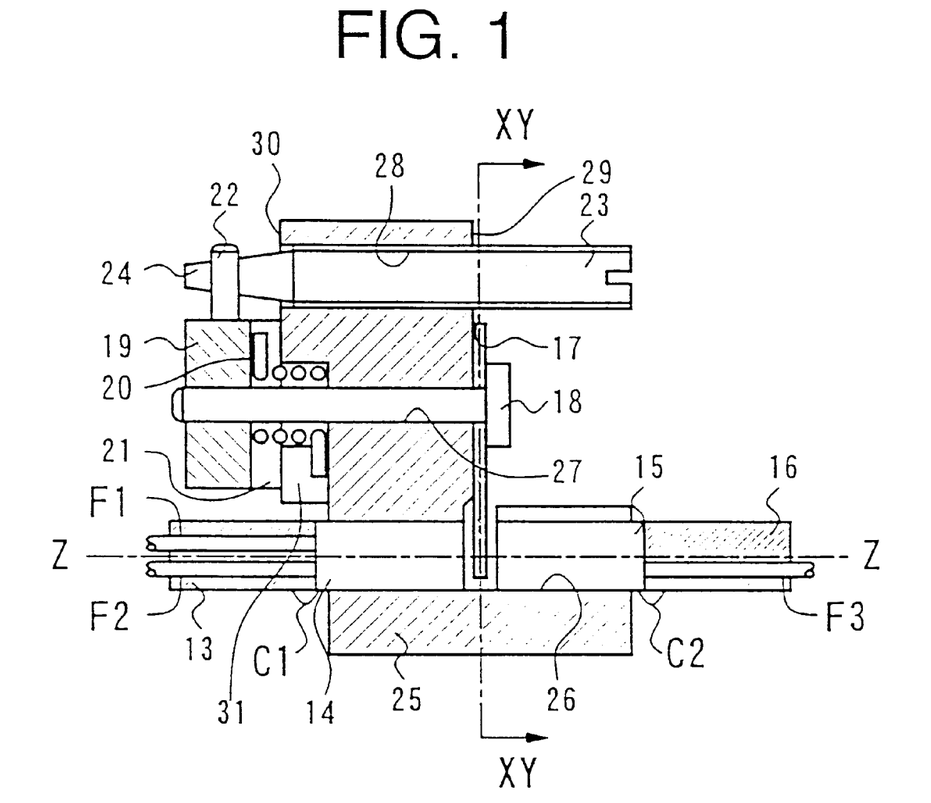
FIG. 1 is a top plan sectional view of an embodiment of an optical multiplexing/demultiplexing device with a variable branching ratio in accordance with the present invention.
Figure 2:
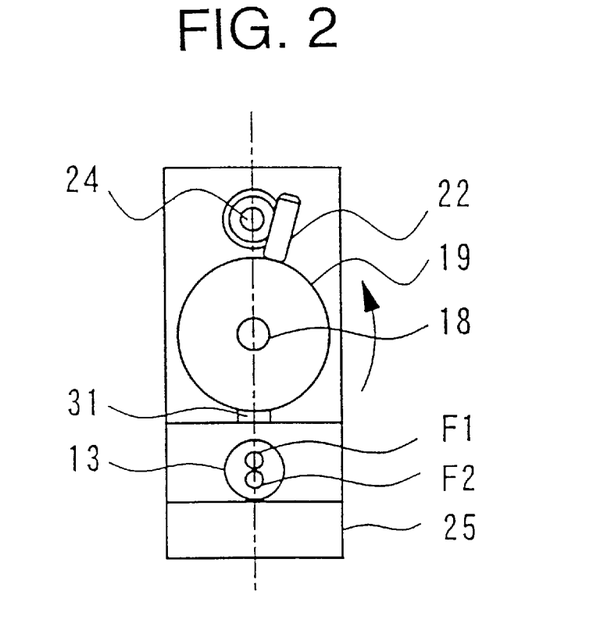
FIG. 2 is a left side view of the embodiment shown in FIG. 1.
Figure 3:
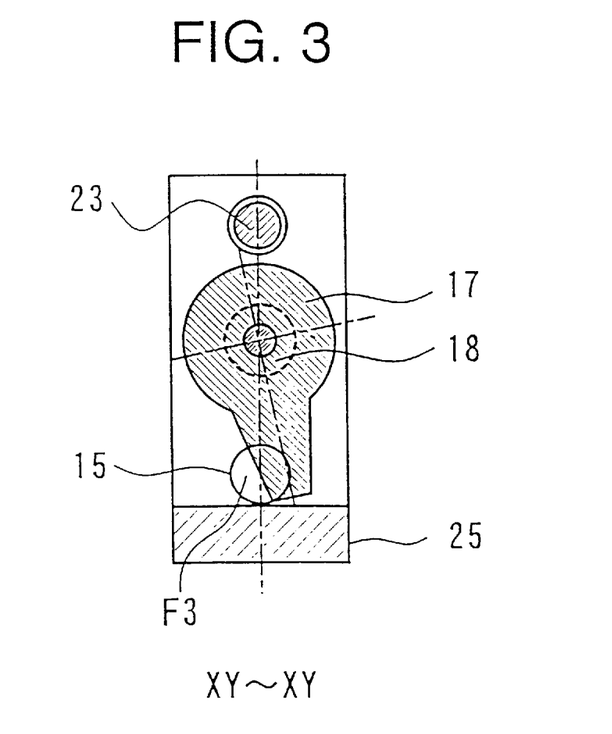
FIG. 3 is a sectional view along the line XY of the embodiment shown in FIG. 1.

FIG. 1 is a top plan sectional view of an embodiment of an optical multiplexing/demultiplexing device with a variable branching ratio in accordance with the present invention; FIG. 2 is a left side view of the embodiment shown in FIG. 1; and FIG. 3 is a sectional view along the line XY of the embodiment shown in FIG. 1. In this embodiment, the foregoing elements, namely, first and second collimator lens assemblies C1 and C2, a reflection mirror means, and a driving means for moving the reflection mirror means, are installed on an aligning block 25 constituting an aligning means. In the aligning block 25, an aligning hole 26 for rod lenses 14 and 15 of the first and second collimator lens assemblies C1 and C2, which will be discussed hereinafter, an inserting hole 27 for a flanged rotating shaft 18, and a tapped hole 28 in which an adjusting threaded rod 23 is screwed are provided in parallel to an optical axis ZZ. Furthermore, parallel surfaces 29 and 30 orthogonal to the optical axis ZZ are provided.

The collimator lenses 9 and 10 employ rod lenses having an outside diameter of 2 mm and a reference axial length of 0.25 pitch that are commercially available under a trade name "SELFOC lens" (SFL) by Nippon Sheet Glass Co., Ltd. Other collimator lenses may be used as long as they have a collimating function for forming light, which is projected with some divergence from a light source near a point corresponding to a core of an optical fiber, into a parallel luminous flux. Collimator lenses, rod lenses of 0.5n+0.25 pitch ("n" is 0 or an integer), or micro lenses used as collimators may be used.

The optical fibers $F_1$ and $F_2$ are insert ed and fixed in a hole provided in parallel to a ferrule 13. A distance between the optical fibers $F_1$ and $F_2$ and an optical axis is denoted as "d." The optical fiber $F_3$ is inserted and fixed in a hole located at a distance "d/2" from a central axis of the ferrule 13. End faces of the ferrule and the optical fibers are polished, and the ferrule 13 is joined and secured to the rod lens 14, with their central axis aligned, thus constructing the collimator lens assembly C1. A ferrule 16 is joined and secured to the rod lens 15, with their central axis aligned, thus constructing the collimator lens assembly C2. The collimator lens assemblies C1 and C2 are aligned and fixed on the same optical axis ZZ, with a gap of 1 mm or less provided between the rod lenses by the aligning block 25 as shown in FIG. 1.

The mode field diameter 11 of a light beam shown in FIG. 5 is formed on the optical reference plane, and is substantially equal to a diameter of a light beam at end faces of the rod lenses 9 and 10. If rod lenses and single-mode optical fibers having the specifications set forth above are used, then a measured value of the mode field diameter is approximately 320 μm when a light wavelength of a light source is 1310 nm.

The reflection mirror 12 is able to move on .the optical reference plane between the rod lenses 9 and 10. In the embodiment in accordance with the present invention, a stainless steel sheet having a thickness of 0.3 mm to 0.4 mm is used for a reflection mirror 17. Both surfaces of the reflection mirror are coated with a Ti—N film having a hardness of MHv 1800 or more, and further coated with gold (Au) by sputtering. The reflection mirror 17 is combined with the flanged rotating shaft 18 into one piece by laser spot welding so that squareness accuracy is 1/5000 or less. The rotating shaft 18 is rotatably inserted in a hole 27 provided in an aligning means 25. An actuator bushing 19 is secured to the other end of the rotating shaft 18 such that the bushing and the reflection mirror 17 clamp the aligning means 25 therebetween. Both the actuator bushing 19 and the aligning means 25 are provided with grooves 21 and 31, and a torsion spring 20 is provided between the actuator bushing 19 and the aligning means 25. Both ends of the torsion spring 20 are restricted by the grooves 21 and 31, and the actuator bushing 19 urges the aligning means counterclockwise in FIG. 2 and FIG. 3 (in a direction of an arrow in FIG. 2). The actuator bushing 19 is installed to the flanged rotating shaft 18 during the assembly, and provided with a pin 22 on its outer periphery.

The aligning block 25 constituting the aligning means is provided with a tapped hole 28 positioned in parallel to the hole 27. The adjusting threaded rod 23 for rotatably adjusting the reflection mirror 17 is inserted and coupled in the tapped hole 28. In this embodiment, the thread has a diameter of 3 mm and a pitch of 0.35. One end of the adjusting threaded rod 23 is provided with a slit in which a screwdriver is fitted for screwing, and a distal end portion 24 is tapered by 1/5 acute angle. The pin 22 of the reflection mirror assembly is pressed against the distal end portion 24, and the Distal end portion 24 restricts the counterclockwise rotational position of the reflection mirror 17.

Adjustment of the rotational position of the reflection mirror 17 will be described. Screwing the adjusting threaded rod 23 causes the distal end portion 24 with the acute-angle tapered portion to press the. pin 22 of the actuator bushing 19. The actuator bushing 19 is rotated counterclockwise against the urging force applied by the torsion spring 20. This causes the reflection mirror 17 coupled to the actuator bushing 19 by the rotating shaft 18 to also rotate by the same rotational angle in the opposite direction from that of the arrow shown in FIG. 2.

In this case, if the adjusting threaded rod 23 and the optical axis of the rod lenses 14 and 15 are positioned at 4.5 mm away from the rotating shaft 18, then the reflection mirror 17 rotates 0.637 degree in the opposite direction from that of the arrow when the adjusting threaded rod 23 rotates once. A shift in the rotational direction of the reflection mirror 17 on the optical axis of the rod lenses 14 and 15 at that time is 50 μm. The mode field diameters of the rod lenses 14 and 15 are 320 μm; hence, rotating the adjusting threaded rod 23 by 6.4 times makes it possible to change a branching ratio of a light quantity output to the optical fibers $F_2$ and $F_3$ from 0:100 to 100:0.

Figure 6:
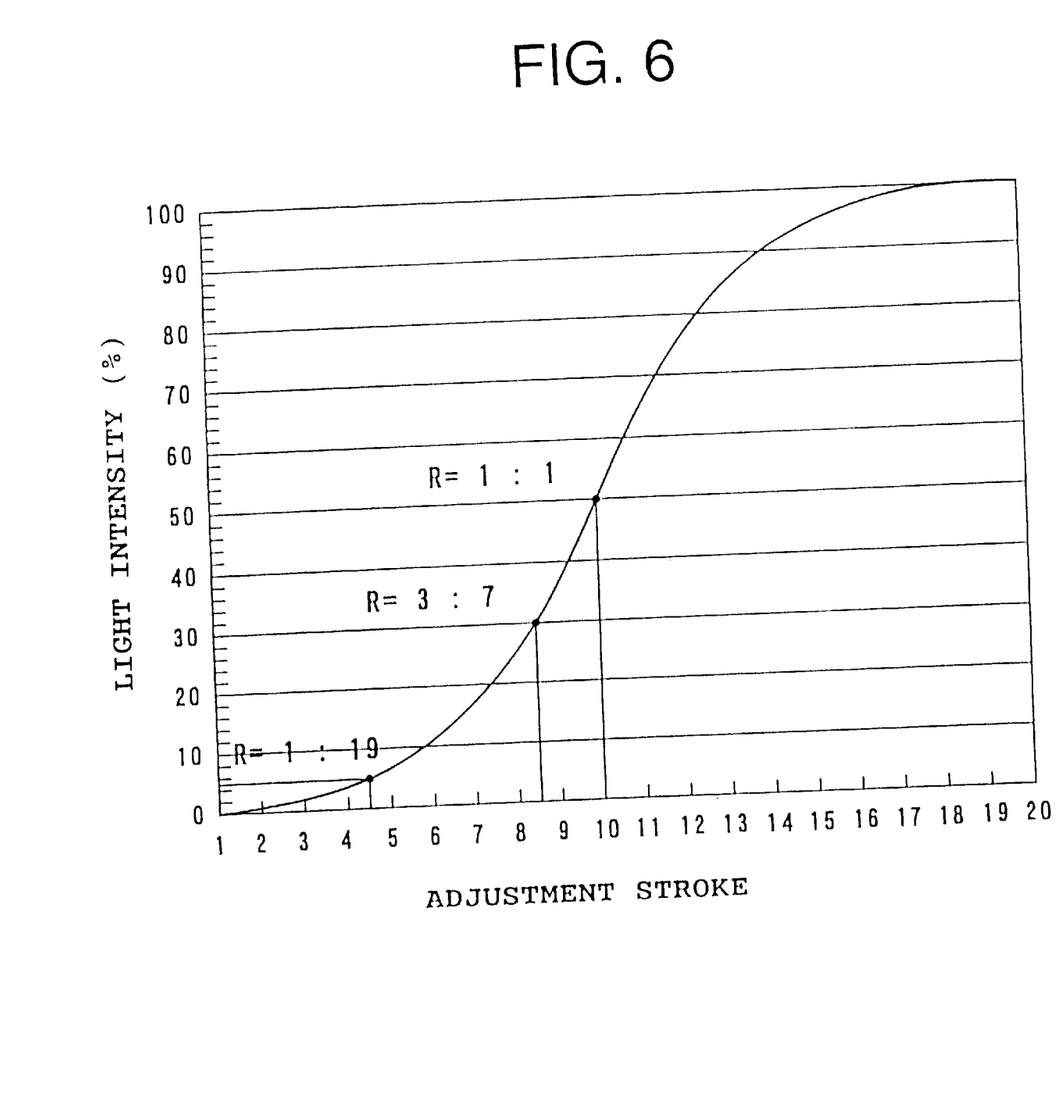
FIG. 6 is a branching ratio change characteristic diagram of the embodiment of the optical multiplexing/demultiplexing device with a variable branching ratio.

Referring now to FIG. 6, operational characteristics of the apparatus will be described. FIG. 6 is a nomogram illustrating a relationship between adjustment strokes of the adjusting threaded rod 23 and light intensities when single-mode optical fibers and a light distribution pattern of a Gaussian beam are used. A point of a scale division 20 of the adjustment stroke is equivalent to 6.4 rotations of the adjusting threaded rod 23. As illustrated, a required number of rotations of the adjusting threaded rod 23 is about 1.44 (4.5×(6.4/20)) when a branching ratio is R=1:19, or about 2.72 when R=3:7, or about 3.2 when R=1:1. Hence, as the branching ratio R increases, the adjustment stroke with respect to light intensity increases accordingly. This arrangement provides an outstanding feature that enhances a resolution for branching ratio adjustment with consequent improved resistance to influences of environments and external forces.

Furthermore, in the conventional polished-block type optical fiber multiplexing/demultiplexing device with variable branching ratio, optical insertion loss increases with an increasing branching ratio. The reflection mirror type optical multiplexing/demultiplexing device with variable branching ratio in accordance with the present invention is constructed based on the new principle wherein a mode field area of a light beam at an end face of a rod lens is continuously divided by the reflection mirror to a reflection end and a transmission end to branch and output input light to an optical fiber on the reflection end and an optical fiber on the transmission end. Accordingly, there is no optical insertion loss attributable to a branching ratio.

Usually, manufacture of optical multiplexing/demultiplexing device, whether they have fixed or variable branching ratios, usually becomes more difficult as the branching ratio increases. In addition, with an increasing branching ratio, the optical multiplexing/demultiplexing devices become more susceptible to influences of environments and external forces, deteriorating reliability. For these reasons, a maximum branching ratio of the conventional optical multiplexing/demultiplexing device has been limited to 1:9. In contrast to this, the reflection mirror type optical multiplexing/demultiplexing device with a variable branching ratio in accordance with the present invention permits a maximum branching ratio of 0:100 as described above. Moreover, conversely from the conventional optical multiplexing/demultiplexing device, it can be seen that a branching ratio can be set more easily as the branching ratio increases.

Thus, as described in detail above, the reflection mirror type optical multiplexing/demultiplexing device with variable branching ratio in accordance with the present invention is constructed based on the new principle wherein a mode field area of a light beam at an end face of a rod lens is continuously divided by the reflection mirror to a reflection end and a transmission end to branch and output input light to an optical fiber on the reflection end and an optical fiber on the transmission end. The advantages of this optical multiplexing/demultiplexing device with variable branching ratio may be summarized as follows:

(1) The structure is simple, so that component parts can be mass-produced easily from a viewpoint of production technology.

(2) There is no optical insertion loss attributable to a branching ratio.

(3) The branching ratio of light quantity can be continuously changed from 0:100 to 100:0.

(4) Based on the principle, an adjustment amount in relation to a light intensity increases as a branching ratio increases. Hence, a resolution of the branching ratio adjustment can be increased, and susceptibleness to influences of environments and external forces is reduced accordingly.

In the same manner as that for the reflection mirror type optical multiplexing/demultiplexing device with a variable branching ratio, an optical coupler with a variable coupling ratio can be implemented. FIG. 7 is a schematic representation illustrating an operation of an embodiment of the optical coupler with a variable coupling ratio in accordance with the present invention. This embodiment can be accomplished simply by eliminating the optical fiber $F_2$ of the embodiment explained above with reference to FIG. 1 through FIG. 6. The reflection mirror is required to simply provide a function as a shutter.

A first collimator lens assembly includes a first collimator lens 9 and a first optical fibers $F_1$ which has a distal end thereof optically coupled to one end face of the lens, being away from an optical axis of the lens 9 by a predetermined distance. A second collimator lens assembly includes a second collimator lens 10 and a second optical fiber $F_3$ which has a distal end thereof optically coupled to one end face of the lens, being away from the optical axis of the lens by the predetermined distance. An aligning means, which is not shown, disposes the first and second collimator lens assemblies so that they oppose each other symmetrically with respect to an optical reference plane, optical axis thereof being aligned. The aligning means fixedly supports the collimator lens assemblies so that an image at the distal end of the first optical fiber is formed at the distal end of the second optical fiber. As the aligning means, an aligning block similar to that previously mentioned may be used. A shutter means 112 is supported by the aligning means so that the shutter means 112 may move in the reference plane to couple a part or all of a parallel beam of an expanded mode field area, which is emitted from the first optical fiber and formed on the reference plane, to the second optical fiber $F_3$. The shutter means is jogged by a driving means. The driving means may employ exactly the same constructions as that previously mentioned.

Figure 7A:
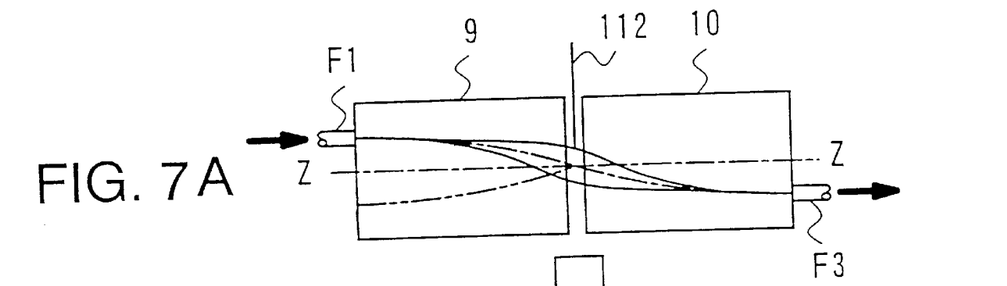
FIG. 7 is a schematic representation illustrating an operation of an embodiment of an optical coupler with a variable coupling ratio in accordance with the present invention.

FIG. 7A illustrates a state wherein the shutter 112 is positioned outside an expanded mode field, and 100% of light from the first optical fiber $F_1$ is transmitted to the second optical fiber $F_3$.

Figure 7B:
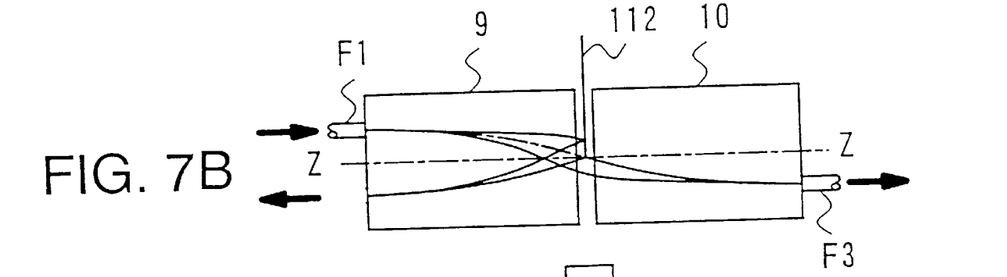

FIG. 7B illustrates a state wherein the shutter 112 cuts off or reflects 50% of a luminous flux of the expanded mode field, and as a result, 50% of the light from the first optical fiber $F_1$ is transmitted to the second optical fiber $F_3$.

Figure 7C:
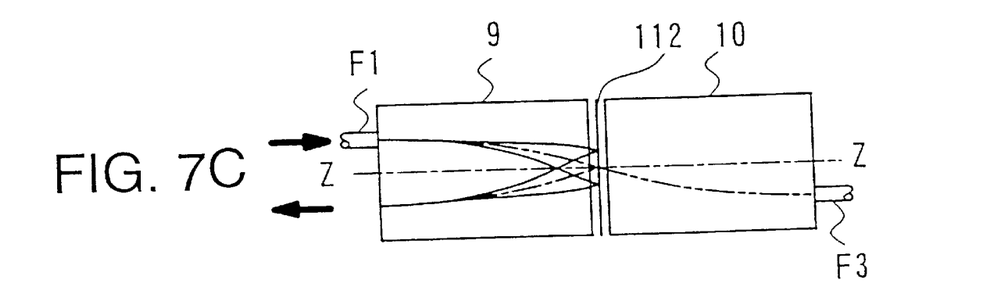

FIG. 7C illustrates a state wherein the shutter 112 cuts off or reflects 100% of a luminous flux of the expanded mode field, and as a result, 100% of the, light from the first optical fiber $F_1$ is cut off and therefore not transmitted to the second optical fiber $F_3$.

In the same manner as that for the reflection mirror type optical multiplexing/demultiplexing device with a variable branching ratio, another optical coupler with a variable coupling ratio can be implemented. FIG. 8 is a schematic representation illustrating an operation of another embodiment of the optical coupler with a variable coupling ratio in accordance with the present invention. This embodiment can be accomplished simply by eliminating the second collimator lens assembly C2 of the embodiment explained above with reference to FIG. 1 through FIG. 6.

A collimator lens assembly includes a collimator lens 9 and first and second optical fibers $F_1$ and $F_2$ which have distal ends thereof optically coupled to one end face of the lens, being away from an optical axis of the lens by a predetermined distance. An aligning means, which is not shown, supports and secures the collimator lens so that an optical axis of the collimator lens assembly is perpendicular to an optical reference plane. A reflection mirror means 12 is supported by the aligning means so that the reflection mirror means 12 may move in the reference plane to reflect and connect a part or all of a parallel beam of an expanded mode field area, which is emitted from the first optical fiber and formed on the reference plane, to the second optical fiber $F_2$. The driving means jogs the reflection mirror 12.

Figure 8A:
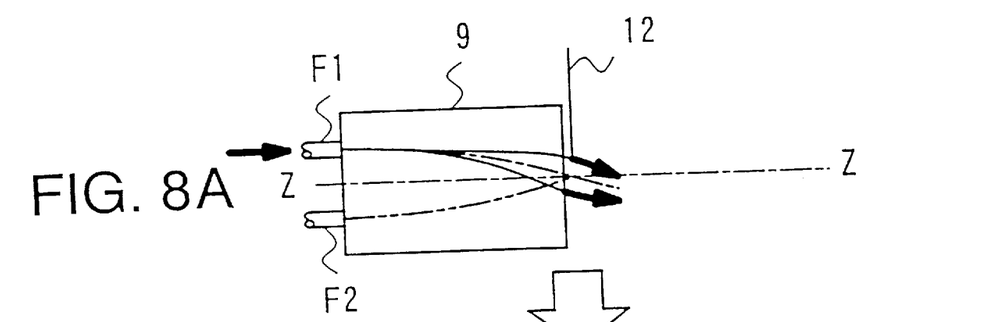
FIG. 8 is a schematic representation illustrating an operation of another embodiment of an optical coupler with a variable coupling ratio in accordance with he present invention.
Figure 8B:
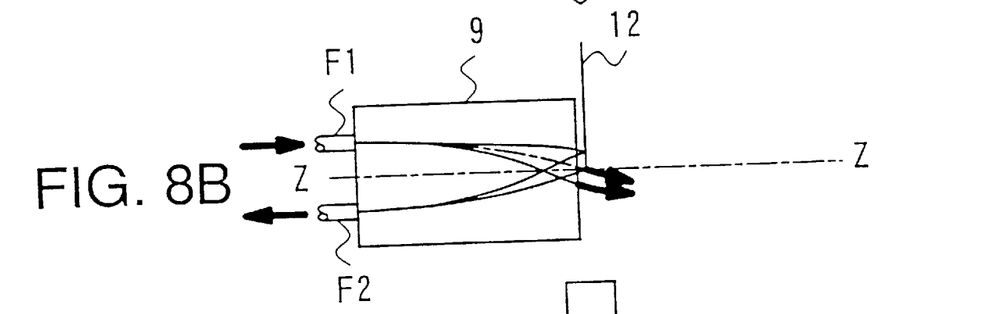
Figure 8C:
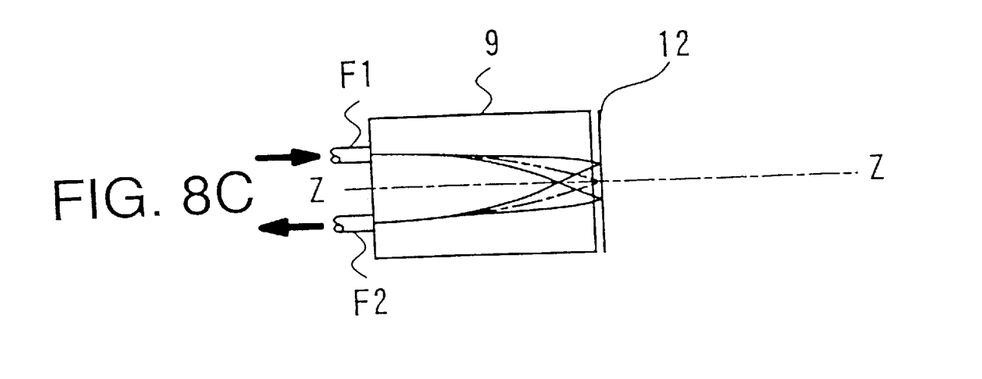

FIG. 8A illustrates a state wherein the reflection mirror 12 is positioned out of an expanded mode field, and none of the light from the first optical fiber $F_1$ are reflected and transmitted to the second optical fiber $F_2$. FIG. 8B illustrates a state wherein the reflection mirror 12 reflects 50% of a luminous flux of the expanded mode field, and as a result, 50% of the light from the first optical fiber $F_1$ is transmitted to the second optical fiber $F_2$. FIG. 8C illustrates a state wherein the reflection mirror 12 reflects 100% of the luminous flux of the expanded mode field, and as a result, 100% of the light from the first optical fiber $F_1$ is transmitted to the second optical fiber $F_2$.

As described in detail above, the optical coupler with a variable coupling ratio in accordance with the present invention is constructed based on the new principle wherein a mode field area of a light beam at an end face of a rod lens is continuously divided by a shutter or a reflection mirror, which is similar to that in the foregoing demultiplexing device, to a reflection end and a transmission end to branch and output input light to an optical fiber on the reflection end or an optical fiber on the transmission end. The advantages of this optical coupler with a variable coupling ratio may be summarized as follows:

(1) The structure is simple, so that component parts can be mass-produced easily from a viewpoint of production technology.

(2) The transmission ratio of light quantity can be continuously changed from 0:100 to 100:0.

(3) Adjustment amount at an upper or lower limit of the transmission ratio increases, so that a higher resolution in adjusting a branching ratio can be achieved, and reduced susceptibleness to influences of environments and external forces can be accordingly achieved.

What is claimed is:

1. An optical multiplexing/demultiplexing device with variable branching ratio, comprising:

a first collimator lens assembly including a first collimator lens, and first and second optical fibers $F_1$ and $F_2$ which have distal ends thereof optically coupled to one end face of the lens, being away from each other by a distance d, an optical axis of the lens positioned at a midpoint therebetween;

a second collimator lens assembly including a second collimator lens and a third optical fiber $F_3$ which has a distal end thereof optically coupled to one end face of the lens, being away from an optical axis of the lens by a distance d/2;

aligning means for disposing the first and second collimator lens assemblies so that they oppose each other symmetrically with respect to an optical reference plane, with optical axis thereof being aligned, and for fixedly supporting the collimator lens assemblies so that an image at the distal end of the first optical fiber is formed at the distal end of the third optical fiber;

reflection mirror means which is supported by the aligning means so that the reflection mirror means may move within the reference plane, and reflects and connects a part of a parallel beam of an expanded mode field area that is emitted from the first optical fiber and formed on the reference plane to the second optical fiber $F_2$, or transmits and connects the part of the parallel beam to the third optical fiber $F_3$; and driving means for moving the reflection mirror from a full reflecting position to a partial reflecting position.

2. An optical multiplexing/demultiplexing device with variable branching ratio according to claim 1, wherein the first and second collimator lenses are rod lenses having a reference length of 0.25 pitch, and the first and second optical fibers are supported by a first ferrule, while the third optical fiber is supported by a second ferrule, these three optical fibers being coupled to the rod lenses constituting the first and second collimator lens assemblies.

3. An optical multiplexing/demultiplexing device with variable branching ratio according to claim 1, wherein a shaft of the reflection mirror of the reflection mirror means is inserted in a shaft hole which is provided in the aligning means and parallel to the optical axis of the collimator lenses, and the reflection mirror means is guided by one or more guiding surfaces positioned virtually at right angles to the shaft hole of the aligning means.

4. An optical multiplexing/demultiplexing device with variable branching ratio according to claim 1, wherein the shaft of the reflection mirror of the reflection mirror means has a behavior of rotating in one direction with respect to the aligning means, and the driving means for moving the reflection mirror moves the mirror means against the behavior of rotating in one direction.

5. An optical coupler with variable coupling ratio, comprising:

- a first collimator lens assembly including a first collimator lens and a first optical fiber which has a distal end thereof optically coupled to one end face of the lens, being away from an optical axis of the lens by a predetermined distance;
- a second collimator lens assembly including a second collimator lens and a second optical fiber which has a distal end thereof optically coupled to one end face of the lens, being away from an optical axis of the lens by a predetermined distance;
- aligning means for disposing the first and second collimator lens assemblies so that they oppose each other symmetrically with respect to an optical reference plane, with optical axis thereof being aligned, and for fixedly supporting the collimator lens assemblies so that an image at the distal end of the first optical fiber is formed at the distal end of the second optical fiber;
- shutter means which is supported by the aligning means so that the shutter means may move within the reference plane, and reflects and connects a part of a parallel beam of an expanded mode field area that is emitted from the first optical fiber and formed on the reference plane to the second optical fiber; and
- driving means for moving the shutter from a full reflecting position to a partial reflecting position.

6. An optical coupler with variable branching ratio, comprising:

- a collimator lens assembly including a collimator lens and first and second optical fibers $F_1$ and $F_2$ which have distal ends thereof optically coupled to one end face of the lens, being away from each other by a predetermined distance with an optical axis of the lens positioned at a midpoint therebetween;
- aligning means for fixedly supporting the collimator lens assembly so that an optical axis of the collimator lens assembly is positioned at right angle to an optical reference plane;
- reflection mirror means including a reflection mirror which is supported by the aligning means so that the reflection mirror may move within the reference plane, and reflects and connects a part of a parallel beam of an expanded mode field area that is emitted from the first optical fiber and formed on the reference plane to the second optical fiber $F_2$; and
- driving means for moving the reflection mirror from a full reflecting position to a partial reflecting position.

* * * * *